US010693638B1

(12) United States Patent
Cignetti et al.

(10) Patent No.: US 10,693,638 B1
(45) Date of Patent: Jun. 23, 2020

(54) PROTECTED CRYPTOGRAPHIC ENVIRONMENT

(71) Applicant: Amazon Technologies, Inc., Seattle, WA (US)

(72) Inventors: Todd Lawrence Cignetti, Ashburn, VA (US); Matthew John Campagna, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 203 days.

(21) Appl. No.: 15/367,114

(22) Filed: Dec. 1, 2016

(51) Int. Cl.
*H04L 9/08* (2006.01)
*H04L 9/32* (2006.01)
*H04L 29/06* (2006.01)

(52) U.S. Cl.
CPC ............ *H04L 9/0877* (2013.01); *H04L 9/083* (2013.01); *H04L 9/3247* (2013.01); *H04L 9/3263* (2013.01); *H04L 63/0428* (2013.01)

(58) Field of Classification Search
CPC ............ H04L 63/0428; H04L 63/0478; H04L 63/0838; H04L 9/0877; H04L 9/0833; H04L 9/3247; H04L 9/3263; G06F 21/10; G06F 21/76; G06F 9/3885; G06F 9/3001; H01H 2221/034
See application file for complete search history.

(56) References Cited

U.S. PATENT DOCUMENTS

| 8,892,868 | B1 * | 11/2014 | Jenks | ...................... H04L 29/06 713/153 |
| 2003/0212817 | A1 * | 11/2003 | Matthews | ........... H04L 12/2854 709/238 |
| 2007/0073621 | A1 * | 3/2007 | Dulin | ...................... G06F 21/33 705/50 |

(Continued)

OTHER PUBLICATIONS

Dang, "Recommendation for Applications Using Approved Hash Algorithms" NIST Special Publication 800-107, Revision 1, National Institute of Standards and Technology (NIST), Aug. 2012, retrieved on Nov. 24, 2015, from http://csrc.nist.gov/publications/nistpubs/800-107-rev1/sp800-107-rev1.pdf, 25 pages.

*Primary Examiner* — Alexander Lagor
*Assistant Examiner* — William B Jones
(74) *Attorney, Agent, or Firm* — Davis Wright Tremaine LLP

(57) ABSTRACT

A secret cryptographic key is stored in a protected state. While in the protected state, the secret cryptographic key is encrypted with a plurality of cryptographic keys, each of which is used to re-create the plaintext version of the secret cryptographic key. A service operated by an online service provider creates an isolated network environment containing a bastion computer system in communication with an HSM. After establishing the isolated network environment, the online service provider provides a service provider key to the HSM. An HSM key is present on the HSM, and an administrator key is provided by one or more key administrators. Using the HSM key, the service provider key, and the (Continued)

administrator key, the HSM performs cryptographic operations using the secret cryptographic key. When complete, the isolated network environment is deconstructed and the secret cryptographic key is returned to online storage in a protected state.

20 Claims, 10 Drawing Sheets

(56) References Cited

U.S. PATENT DOCUMENTS

| | | | |
|---|---|---|---|
| 2014/0019745 A1* | 1/2014 | Dodgson | H04L 63/065 713/150 |
| 2015/0082399 A1* | 3/2015 | Wu | H04L 63/10 726/6 |
| 2015/0254677 A1* | 9/2015 | Huxham | G06K 19/0709 705/57 |
| 2016/0078437 A1* | 3/2016 | Tahon | H04L 9/14 705/77 |

* cited by examiner

PROTECTED CRYPTOGRAPHIC ENVIRONMENT

BACKGROUND

Historically, sensitive cryptographic keys such as root private keys of public key infrastructures ("PKIs") have been stored on hardware security modules ("HSMs") that are maintained and operated in one or more off-line environments. The off-line environments are not connected to or in communication with any publicly accessible network. The sensitive cryptographic keys are broken into parts, and the parts are saved to multiple HSMs. Each of the multiple HSMs is stored in a different secure physical location such as a safe, safe deposit box, or vault. Although physical separation of the parts provides significant security for the cryptographic keys, it creates problems when trying to use the cryptographic keys to sign or decrypt data. In order to use the cryptographic keys, PKI administrators must physically retrieve the HSMs from the secure physical locations and conduct a ceremony in which the cryptographic keys on the HSMs are assembled and used. Such ceremonies are time-consuming, cumbersome, and expensive.

BRIEF DESCRIPTION OF THE DRAWINGS

Various techniques will be described with reference to the drawings, in which.

DETAILED DESCRIPTION

Figure 1:
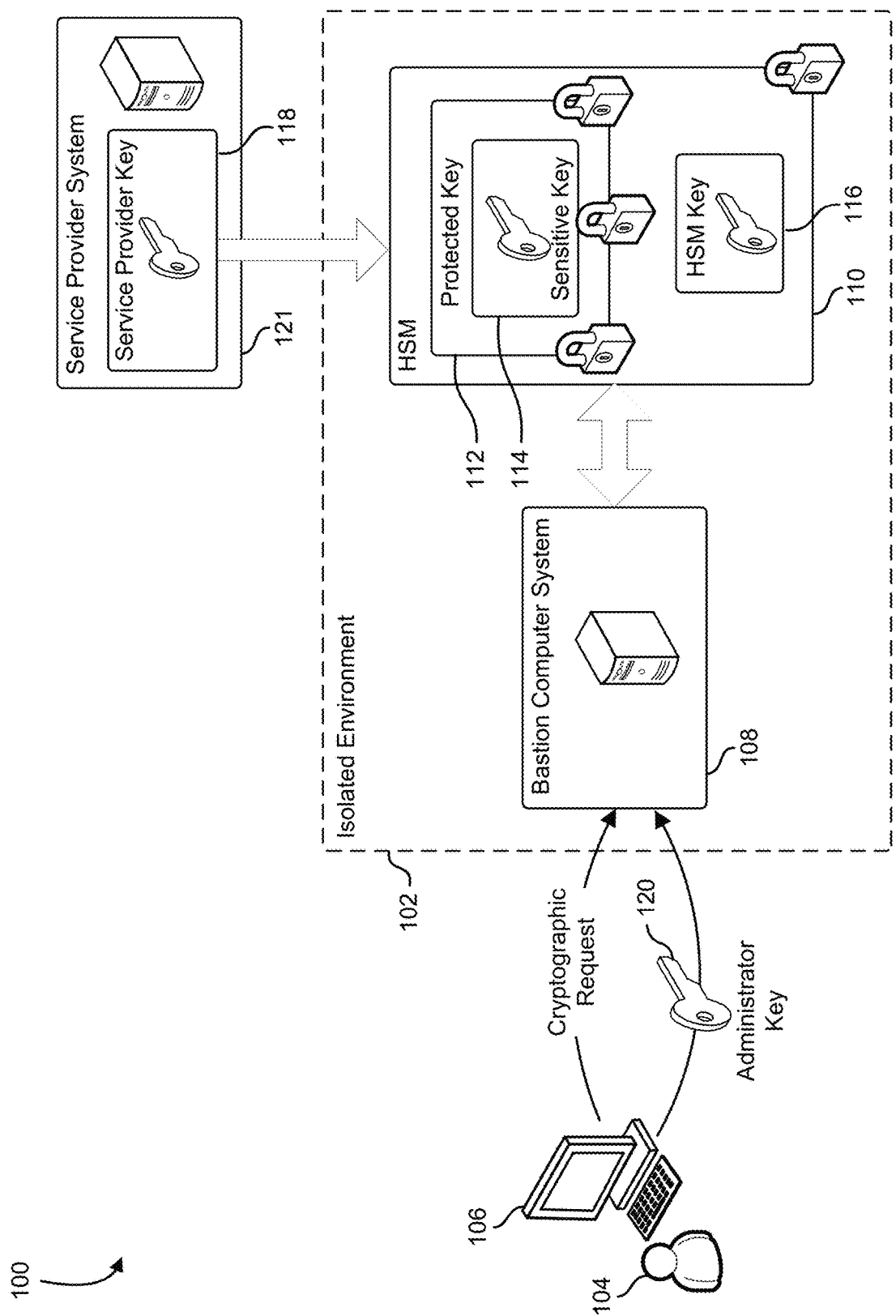
FIG. 1 shows an illustrative example of an environment in which various embodiments may be practiced.

The current document describes systems and methods that provide additional security for sensitive cryptographic keys by providing a protected network environment in which to perform cryptographic operations using the sensitive cryptographic keys. Sensitive cryptographic keys are encrypted and stored on a network-accessible storage device. The protected sensitive cryptographic keys are encrypted with a number of cryptographic keys, all of which are required to access the plaintext version of the sensitive cryptographic keys. One of the cryptographic keys resides on a hardware security module ("HSM") and is controlled by the manufacturer of the HSM. Another of the cryptographic keys is controlled by a computing resource service provider. Yet another of the cryptographic keys is controlled by the owner of the sensitive cryptographic keys, and may be split into a plurality of key parts under the control of a corresponding plurality of key administrators. While in protected form, the sensitive cryptographic keys may not be used to perform encryption, decryption, or signing operations.

When an administrator of the sensitive cryptographic keys requests, from the computing resource service provider, performance of a cryptographic operation using the sensitive cryptographic keys, the computing resource service provider creates an isolated network environment that includes a bastion computer system connected to an HSM. A bastion computer system may include, for example, a physical or virtual computer system that is hardened against attacks and that controls access to a protected computer network. In some examples, the bastion may include one or more firewalls that limit access to the bastion by one or more entities outside the protected computer network. The HSM is provided with a service provider key by the computing resource service provider, and the HSM includes an HSM-manufacturer's key. The bastion computer system may be a personal computer system, computer server, server cluster, network appliance, or virtual computer system. The computing resource service provider retrieves the protected sensitive cryptographic keys from a storage device or storage service, and stores the protected sensitive cryptographic keys on the HSM. In some examples, the HSM is a physical device connected to the bastion computer system via a backplane or serial interface. In other examples, the HSM is a network-connected HSM that is configured to be within the restricted network environment, and the network-connected HSM connects to the bastion computer system via the isolated network environment.

The computing resource service provider isolates the bastion computer system within an isolated network environment. In some implementations, the computing resource service provider configures a number of routers to isolate a physical computer system that serves as the bastion computer system. In other implementations, the computing resource service provider provisions a virtual computer system to act as the bastion computer system and configures an isolated virtual network in which the virtual bastion computer system operates. The isolated network environment may be accessed by a client computer system operated by an administrator of the sensitive cryptographic keys. Using the client computer system, the administrator authenticates with the computing resource service provider, and the computing resource service provider facilitates the creation of a protected network connection between the client computer system and the bastion computer system. In various implementations, the protected network connection may be established using a virtual private network ("VPN") connection or a transport layer security ("TLS") connection. In some examples, a plurality of administrators may provide a corresponding plurality of key parts that are necessary to use the sensitive cryptographic keys. In such examples, each administrator may access the bastion computer system from a different client computer system, via a different protected network connection.

In order to use the sensitive cryptographic keys, the administrator of the sensitive cryptographic keys uses a client computer system to connect to the computing resource service provider and requests access to the isolated network environment for performing operations using the sensitive cryptographic keys. The computing resource service provider may authenticate the administrator using a combination of digital certificates, usernames and passwords, biometrics, and multifactor authentication. If the computing resource service provider determines that the administrator is authorized to use the sensitive cryptographic key, the computing resource service provider retrieves the protected sensitive cryptographic keys from storage. The protected sensitive cryptographic keys are written to an HSM that is connected to the bastion computer system, and a protected network connection is created between the administrator's client computer system and the bastion computer system. The HSM includes an HSM-manufacturer key and the computing resource provider provides the service provider key to the HSM. To use the sensitive cryptographic keys, the administrator provides an administrator key to the HSM, and the HSM uses the HSM-manufacturer key, the service provider key, and the administrator key to gain access to the plaintext form of the sensitive cryptographic keys.

Once access to the plaintext form of the sensitive cryptographic keys is obtained by the HSM, the HSM is able to perform cryptographic operations requested by the administrator. After the requested cryptographic operations are complete, the computing resource service provider erases the sensitive cryptographic keys from the HSM, deallocates the bastion computer system, and deconstructs the isolated network. The sensitive cryptographic keys remain stored on the storage device or storage service in protected form. In some implementations, if the state of the HSM has changed, the state of the HSM is reencrypted using the administrator's key, the service provider key, and HSM key, and the encrypted state of the HSM is stored on a network-connected storage device or storage service. The HSM generates logs that describe the operations performed. The logs may be encrypted or signed with one or more of the HSM key, the administrator's key, and the service provider key, and stored outside the HSM to a storage device or storage service for later use.

FIG. 1 shows an illustrative example of an environment in which various embodiments may be practiced. A diagram 100 shows an isolated environment 102 in which a sensitive cryptographic key may be used to perform cryptographic operations submitted by an administrator 104 via an administrative console 106. In some examples, the isolated environment 102 is created by configuring a number of network routers, switches, or other network devices to create a protected network in which the entities within the isolated environment 102 are not generally accessible to entities outside the isolated environment 102. In some implementations, the isolated environment 102 is created by creating a virtual network. The isolated environment 102 includes a bastion computer system 108, and an HSM 110. The isolated environment 102 is configured to exclude network traffic from devices other than the bastion computer system 108, the HSM 110, and the administrative console 106. In some examples where the isolated environment 102 is a virtual network, and the bastion computer system 108 is a virtual computer system residing within the virtual network. The HSM 110 may be a network-connected HSM connected to the isolated environment 102 by configuring a physical or virtual router to allow communication between the network-connected HSM and the isolated environment 102. In some examples, the HSM 110 is an HSM card or serial-connected HSM that is connected to a host computer system running a virtual-machine runtime, and the bastion computer system 108 is virtual machine hosted by the host computer system, and the HSM 110 is connected to the bastion computer system 108 using a virtual driver supplied to the virtual-machine runtime.

The HSM 110 holds a protected sensitive cryptographic key 112. When the isolated environment 102 is created, the protected sensitive cryptographic key 112 may be retrieved from a storage service outside the isolated environment 102 and stored on the HSM 110. The protected sensitive cryptographic key is a sensitive key 114 that has been encrypted with at least three cryptographic keys; an HSM key 116, a service provider key 118, and an administrator key 120. The HSM key 116 is a key associated with a manufacturer of the HSM 110. In some examples, the HSM key is installed by the manufacturer when the HSM 110 is built. In another example, the HSM key is an HSM-cluster key that is associated with a set of HSMs operated by the owner of the HSM 110. In yet another example, the HSM key is a key particular to the HSM 110, and the protected sensitive cryptographic key 112 may be used only with the HSM 110. The service provider key 118 is a cryptographic key controlled by the computing resource service provider that provides the isolated environment 102. The computing resource service provider allows the administrator 104 to access the isolated environment 102 by the administrative console 106. Using the administrative console 106, the administrator is able to submit cryptographic requests to the HSM 110 via the bastion computer system 108, using the sensitive key 114. The administrator key 120 is a cryptographic key controlled by the administrator 104, and the administrator 104 provides the administrator key 120 to the HSM 110 to allow the HSM to perform cryptographic operations using the sensitive key 114.

The sensitive key 114 is made available for use by decrypting the protected sensitive cryptographic key 112. The protected sensitive cryptographic key 112 is decrypted using the HSM key 116, the service provider key 118, and the administrator key 120. The HSM key 116 is placed on the HSM 110 at the time of manufacture by the HSM manufacturer. The service provider key 118 is retained on a service provider system 121 while the isolated environment 102 is created, and the service provider system 121 provides the service provider key 118 to the HSM 110. When a cryptographic request is received from the administrator 104, the administrator key 120 is provided to the HSM 110 by the administrator via the administrative console 106. Once the protected sensitive cryptographic key 112 has been decrypted to reveal the sensitive key 114, the administrator 104 is able to submit cryptographic requests via the administrative console 106 to the HSM 110 via the bastion computer system 108. The isolated environment 102 provides improved security while performing cryptographic operations using the sensitive key 114. Results of the cryptographic requests are returned to the administrator 104 via the administrative console 106.

After the cryptographic operations using the sensitive key 114 are complete, the computing resource service provider tears down the isolated environment. Any new sensitive cryptographic keys are protected using a combination of the HSM key 116, the service provider key 118, and the administrator key 120, and exported to the bastion computer system 108. The bastion computer system 108 writes the protected new sensitive cryptographic keys to a storage service that will be persisted outside the isolated environment 102. After any new sensitive cryptographic keys are protected and stored, the protected sensitive cryptographic key 112, the sensitive key 114, and any new sensitive cryptographic keys are wiped from the HSM 110, and the HSM 110 is removed from the isolated environment 102. The bastion computer system 108 is wiped, and if the bastion computer system 108 is implemented as a virtual computer system, the virtual computer system is deleted. After the bastion computer system 108 is wiped, the isolated environment 102 is deconstructed. If the isolated environment 102 is a virtual network, the virtual network is deleted.

In some implementations, a set of logs is generated by the HSM 110. The set of logs describes cryptographic operations that are performed using the sensitive key 114. The set of logs is exported to the bastion computer system 108 and saved to the storage service outside the isolated environment 102 before the bastion computer system 108 is wiped. In some implementations, the set of logs is encrypted using the HSM key 116, the service provider key 118, and the administrator key 120. In another implementation, the set of logs is signed using one or more of the HSM key 116, the service provider key 118, and the administrator key 120.

Figure 2:
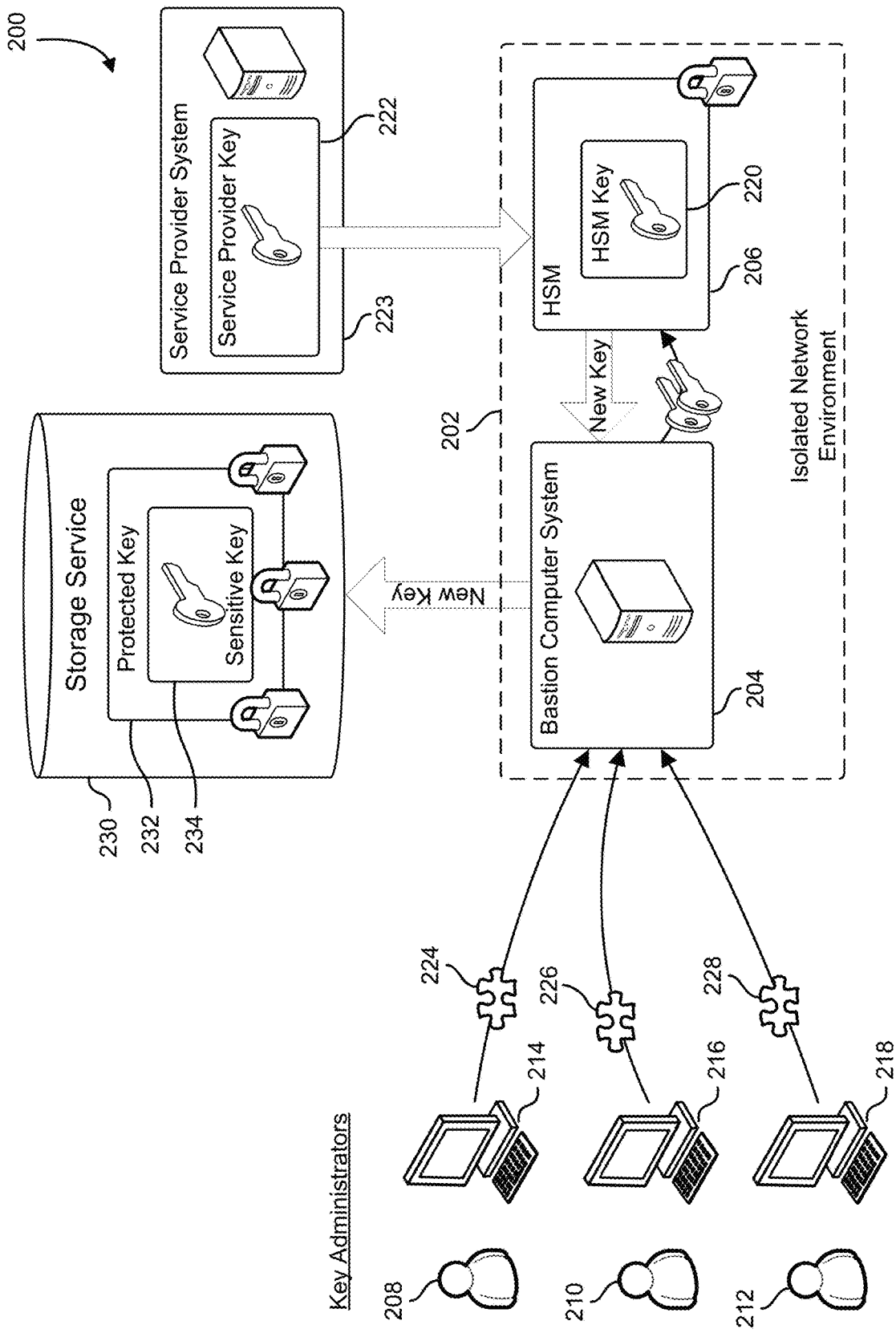
FIG. 2 shows an illustrative example of an environment in which a sensitive cryptographic key is created and protected with a combination of an HSM key, a service provider key, and an administrative key.

FIG. 2 shows an illustrative example of an environment in which a sensitive cryptographic key is created and protected with a combination of an HSM key, a service provider key, and an administrative key. A system diagram 200 shows an isolated network environment 202 that includes a bastion computer system 204 and an HSM 206. The isolated network environment 202 is accessible by a set of administrators 208, 210, and 212. The administrators access the isolated network environment 202 with a corresponding set of administrative consoles 214, 216, and 218. An individual administrative console may be connected to the isolated network environment via a protected network connection. In some implementations, an individual administrative console is connected to the bastion computer system 204 using a transport layer security ("TLS") network connection. In another implementation, an individual administrative console is connected to the isolated network environment 202 via a virtual private network ("VPN") connection.

To create a new sensitive cryptographic key, the set of administrators submit a request to the HSM 206 via the bastion computer system 204. A request to generate a new cryptographic key is valid when submitted by a quorum of the administrators. In some examples, a single administrator constitutes a quorum. In another example, a threshold number of administrators constitutes a quorum. The HSM 206 authenticates the identity of the administrators in the quorum and authorizes the request. The request may include parameters for the new cryptographic key such as a key size, a key strength, or key format.

The HSM 206 generates a new cryptographic key in accordance with any parameters provided with the request. To protect the new cryptographic key, the HSM 206 encrypts the new cryptographic key with a combination of cryptographic keys provided by the manufacturer of the HSM 206, the bastion computer system 204, and to the administrators. An HSM key 220 that is retained on the HSM 206 is used to encrypt the new cryptographic key. In some examples, the HSM key may be a cryptographic key stored on the HSM 206 during the manufacturing process by the manufacturer of the HSM. In other examples, the HSM key is a cluster key stored on a set of HSMs including the HSM 206. In yet another example, the HSM key is a customer key stored on a set of HSMs that are provided to a particular customer by the manufacturer of the HSM. A service provider key 222 is a cryptographic key under the control of a computing resource service provider that creates the isolated network environment 202. The service provider key 222 is retained on a service provider system 223 and is provided to the HSM 206 after the isolated network environment is constructed. The service provider system 223 provides the service provider key 222 to the HSM 206, and the HSM 206 uses the service provider key 222 to add an additional layer of encryption to the new cryptographic key. The set of administrators provide one or more administrative keys to the HSM 206 via the bastion computer system 204. The one or more administrative keys are used by the HSM 206 to add an additional layer of encryption to the new cryptographic key. In some implementations, each administrator in the set of administrators provides a key portion 224, 226, and 228 of an administrator key. The key portions 224, 226, and 228 are relayed by the bastion computer system 204 to the HSM 206, and the HSM 206 assembles key portions to reconstitute the administrator key. In some implementations, the administrator key is partitioned so that only a subset of the key parts is sufficient to reconstitute the administrator key. For example, only 3 of 5, 6 of 10, or M of N where M<N key parts may be required to reconstitute the administrator key. The administrator key is used to add a layer of encryption to the new cryptographic key. In additional implementations, each administrator in the set of administrators provides a different administrator key. The administrator keys are relayed by the bastion computer system 204 to the HSM 206. The HSM 206 applies a corresponding number of additional layers of encryption to the new cryptographic key using each of the administrator keys provided by the set of administrators.

After the new cryptographic key is protected by the layers of encryption as described above, the protected new cryptographic key is exported from the HSM 206 to the bastion computer system 204. In some implementations, the bastion computer system 204 connects to a storage service 230, and the protected key 232 containing the sensitive key 234 is stored to the storage service 230. In another implementation, a ceremony environment manager operated by the computing resource service provider extracts the protected sensitive key from the bastion computer system 204 and stores the protected key 232 on the storage service 230.

Figure 3:
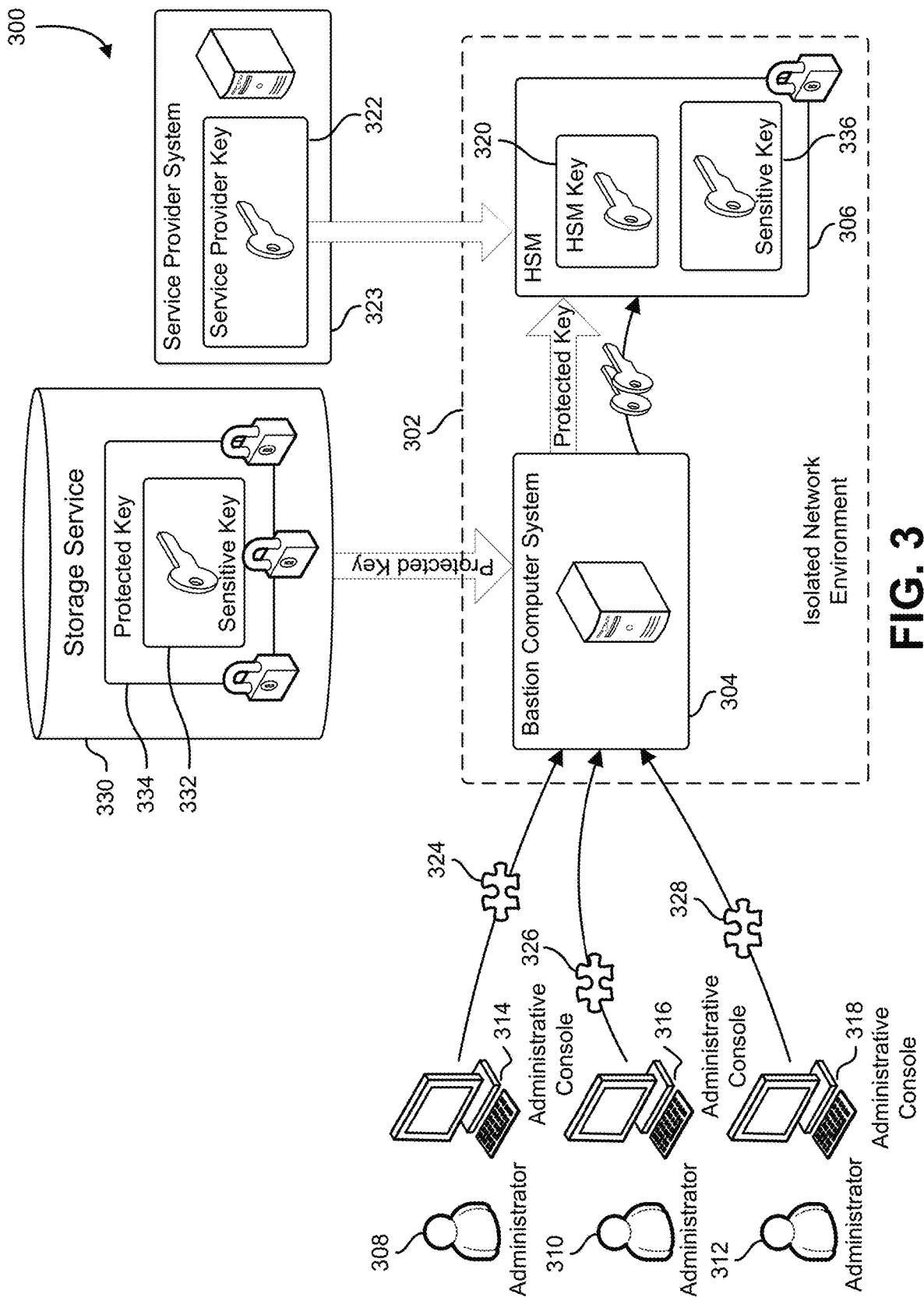
FIG. 3 shows an illustrative example of an environment in which a protected sensitive cryptographic key is retrieved from storage, unlocked, and used to perform cryptographic operations.

FIG. 3 shows an illustrative example of an environment in which a protected sensitive cryptographic key is retrieved from storage, unlocked, and used to perform cryptographic operations. A system diagram 300 shows an isolated network environment 302 that includes a bastion computer system 304 and an HSM 306. The isolated network environment 302 is accessible by a set of administrators 308, 310, and 312. The administrators access the isolated network environment 302 with a corresponding set of administrative consoles 314, 316, and 318. An individual administrative console may be connected to the isolated network environment via a protected network connection. In some implementations, an individual administrative console is connected to the bastion computer system 304 using a transport layer security ("TLS") network connection. In another implementation, an individual administrative console is connected to the isolated network environment 302 via a virtual private network ("VPN") connection.

The set of administrators may submit a request to use a protected sensitive key to a service operated by a computing resource service provider. A request to use a protected sensitive key is valid when submitted by a quorum of the administrators. In some examples, a single administrator constitutes a quorum. In another example, a threshold number of administrators constitutes a quorum. The computing resource service provider authenticates the identity of the administrators in the quorum and authorizes the request. In response to the request, a ceremony environment manager operated by the computing resource service provider creates the isolated network environment 302 containing the bastion computer system 304 and the HSM 306. The ceremony environment manager copies a sensitive cryptographic key 332 in the form of a protected sensitive cryptographic key 334 to the HSM 306.

The HSM 306 uses a combination of an HSM key 320, a service provider key 322, and one or more administrative keys to decrypt the protected sensitive cryptographic key 334 and gain access to the plaintext version of the sensitive cryptographic key 336. The HSM key 320 is stored on the HSM 306. In some examples, the HSM key may be a cryptographic key stored on the HSM 306 during the manufacturing process by the manufacturer of the HSM. In other examples, the HSM key is a cluster key stored on a set of HSMs including the HSM 306. In yet another example, the HSM key is a customer key stored on a set of HSMs that are provided to a particular customer by the manufacturer of the HSM. A service provider key 322 is a cryptographic key stored on a service provider system 323 by a computing resource service provider that creates the isolated network environment 302. The service provider system 323 provides the service provider key 322 to the HSM 306 after the isolated network environment 302 is established. The set of administrators provide one or more administrative keys to the HSM 306 via the bastion computer system 304. The one or more administrative keys are used by the HSM 306 to decrypt one or more additional layers of encryption on the protected cryptographic key. In some implementations, each administrator in the set of administrators provides a key portion 324, 326, and 328 of an administrator key. The key portions 324, 326, and 328 are relayed by the bastion computer system 304 to the HSM 306, and the HSM 306 assembles the key portion to reconstitute the administrator key. In additional implementations, each administrator in the set of administrators provides a different administrator key. The administrator keys are relayed by the bastion computer system 304 to the HSM 306. The HSM 306 removes a corresponding number of additional layers of encryption from the protected cryptographic key using each of the administrator keys provided by the set of administrators. The service provider key 322 and the HSM key 320 are used to remove the remaining layers of encryption around the protected cryptographic key, revealing the sensitive cryptographic key 336.

After the sensitive cryptographic key 336 is extracted from the protected sensitive cryptographic key 334, the administrators 308, 310, and 312 may submit requests to perform cryptographic operations with the sensitive cryptographic key 336. The HSM 306 authenticates and authorizes each request, and generates an internal log that describes the operations performed using the sensitive cryptographic key 336. The results of the cryptographic operations are returned to the requesting administrator, and the internal logs are exported to the bastion computer system 304. In some implementations, the internal logs are encrypted with a combination of the HSM key, the administrator key, and the service provider key. In another implementation, the internal logs are signed with a combination of the HSM key, the administrator key, and the service provider key. The logs may be transferred from the bastion computer system 304 to the administrator consoles 314, 316, and 318, or stored to the storage service 330 when the isolated network environment 302 is disassembled.

Figure 4:
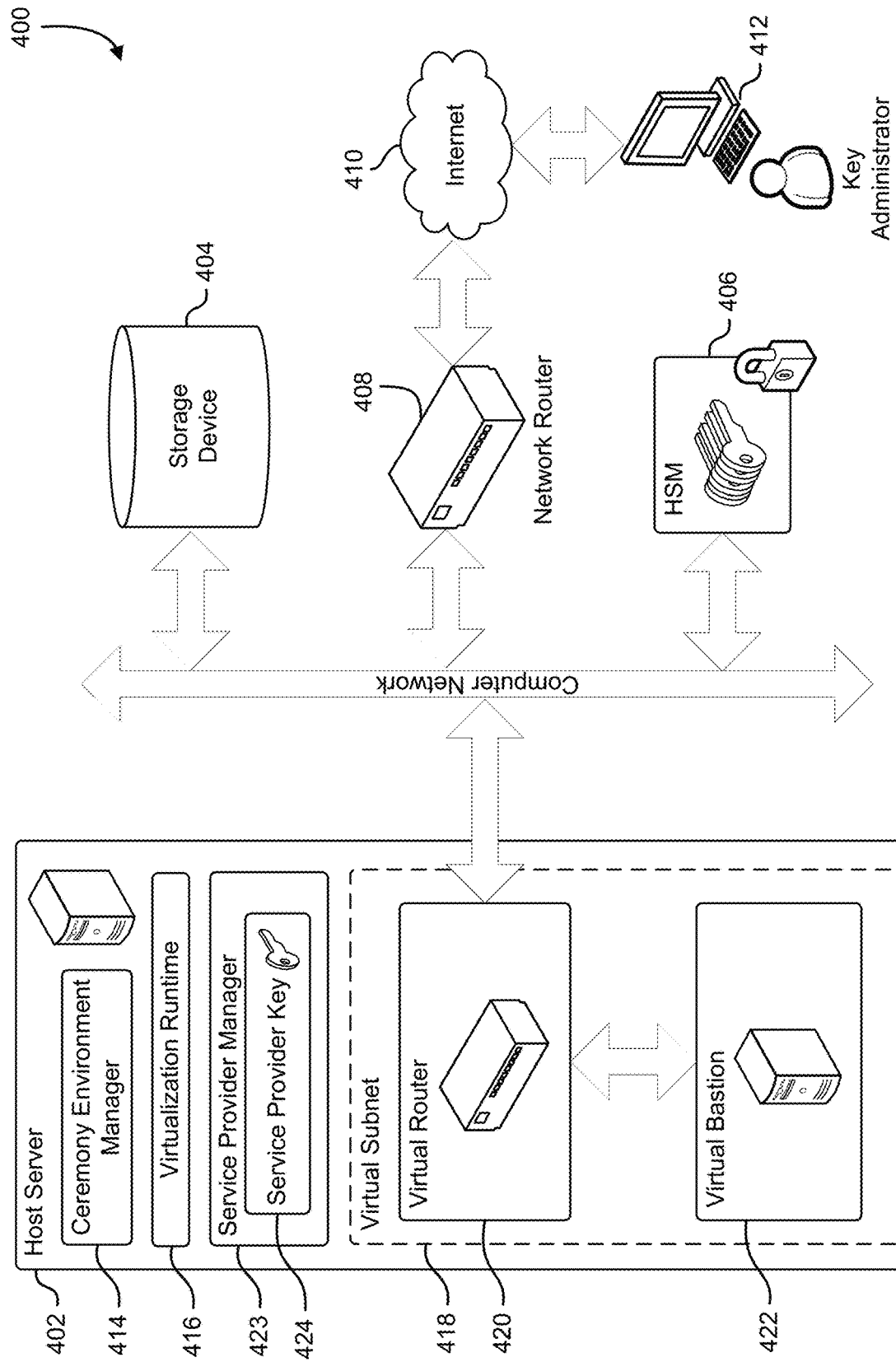
FIG. 4 shows an illustrative example of a system that generates an isolated network environment in which sensitive cryptographic keys are used.

FIG. 4 shows an illustrative example of a system that generates an isolated network environment in which sensitive cryptographic keys are used. A block diagram 400 shows a computing environment operated by a computing resource service provider. The computing environment includes a host server 402, a storage device 404, and HSM 406, and a network router 408 connected to a computer network operated by the computing resource service provider. The network router 408 provides connectivity between the computer network and an external network 410 such as the Internet. Administrators of cryptographic keys may access the computing environment using an administrative console 412 connected to the external network 410.

Using the computing environment, the computing service resource provider is able to provide an isolated environment in which sensitive cryptographic keys may be generated and used. The host server 402 includes a ceremony environment manager 414. The ceremony environment manager is a service that accepts requests from key administrators to use sensitive cryptographic keys. The sensitive cryptographic keys are retained in the storage device 404 and a protected form that requires one or more cryptographic keys to be provided by a combination of the computing resource service provider, an administrator associated with the sensitive cryptographic key, and an HSM. The ceremony environment manager 414 uses a virtualization runtime 416 to generate a virtual subnet 418. The virtual subnet 418 includes a virtual router 420 and a virtual bastion computer system 422. After creating the virtual subnet 418 with the virtual router 420 and the virtual bastion computer system 422, a service provider manager 423 places the service provider key 424 on the HSM 406 after the virtual subnet 418 has been configured. The virtual router 420 restricts access to the virtual bastion computer system 422 by limiting network traffic to those outside network entities that are used to perform the ceremony to access the sensitive cryptographic key. The virtual bastion computer system 422 is connected to the HSM 406 via the virtual router 420.

The ceremony environment manager 414 retrieves the protected version of the sensitive cryptographic key from the storage device 404 and places it on the HSM 406. In some implementations, the ceremony environment manager 414 places the protected version of the sensitive cryptographic key on the virtual bastion computer system 422, and the virtual bastion computer system 422 transfers the protected version of the sensitive cryptographic keyto the HSM 406. The service provider manager 423 transfers the service provider key 424 to the HSM 406. In some examples, the service provider manager confirms that the virtual subnet 418 is sufficiently isolated from outside entities before transferring the service provider key 424 to the HSM 406.

With the virtual subnet 418 in place, and the protected version of the sensitive cryptographic key on the HSM 406, the key administrator connects to the HSM 406 using the administrative console 412, and submits a request to use the sensitive cryptographic key and an administrator key necessary to gain access to the plaintext version of the sensitive cryptographic key from the protected sensitive cryptographic key. The HSM 406 authenticates the administrator, authorizes the request, and receives the administrator key. Using the service provider key, the HSM key, and the administrator key, the HSM 406 decrypts the protected sensitive cryptographic key to reveal the plaintext version of the sensitive cryptographic key. The plaintext version of the sensitive cryptographic key is retained on the HSM 406. In some examples, the protected version of the sensitive graphic key is protected by a key officer and a key administrator, and the officer supplies an officer key in addition to the administrative key supplied by the administrator to gain access to the plaintext version of the sensitive graphic key. In additional examples, a number of key administrators or key officers each hold pieces of an administrative key, and each of the key administrators and key officers supplies their respective key piece to the HSM 406, and the HSM 406 assembles the administrative key from the key pieces.

Once the HSM 406 has gained access to the plaintext version of the sensitive graphic key, cryptographic operations requested by the administrator may be performed, and the results of the cryptographic operations returned to the administrator via the administrative console 412. The HSM 406 generates a series of log files that record the cryptographic operations performed on any sensitive cryptographic keys on the HSM 406. If the administrator requests the generation of a new sensitive cryptographic key, the HSM 406 generates the new sensitive cryptographic key in accordance with any parameters supplied by the administrator, and encrypts the new sensitive cryptographic key with the HSM key, the service provider key, and the administrative key, to generate a protected new sensitive cryptographic key.

After the cryptographic operations have been completed, the administrator signals the ceremony environment manager 414, and the ceremony environment manager 414 deconstructs the isolated environment and protects the sensitive cryptographic key. Log files and protected sensitive cryptographic keys are exported from the HSM 406 to the virtual bastion computer system 422. The ceremony environment manager 414 retrieves the protected cryptographic keys and log files from the virtual bastion computer system 422 and stores them on the storage device 404. The virtual bastion computer system 422 deletes the sensitive graphic keys, the protected sensitive cryptographic keys, the service provider key, the administrator key, and the logs from the HSM 406, and disconnects from the HSM. The ceremony environment manager 414 uses the virtualization runtime 416 to delete the virtual subnet 418, the virtual router 420, and the virtual bastion computer system 422.

Figure 5:
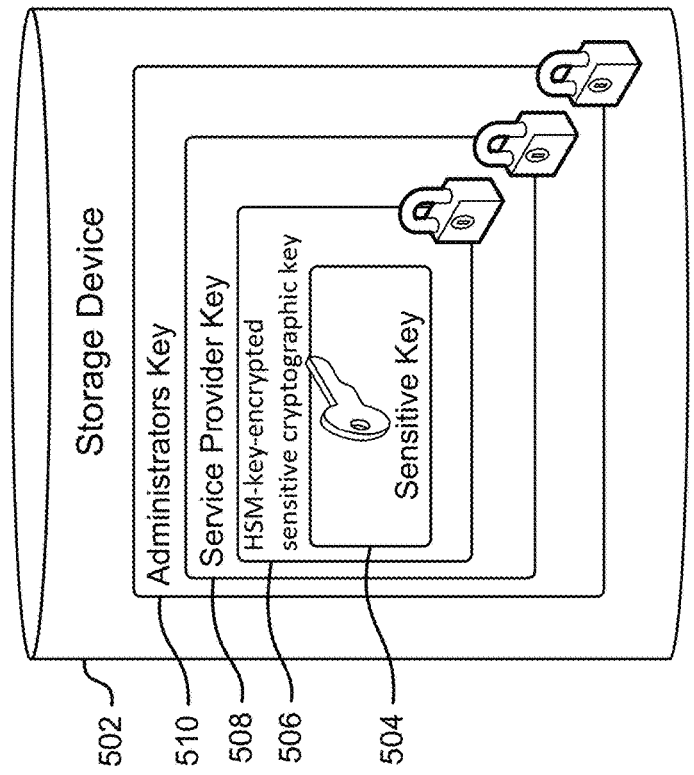
FIG. 5 shows an illustrative example of a storage service containing a protected sensitive cryptographic key.

FIG. 5 shows an illustrative example of a storage service that retains a protected sensitive cryptographic key. A diagram 500 shows a storage device 502. The storage device may be a network-attached storage device, a storage service, or disk drive connected to a bastion computer system. The storage device 502 holds a sensitive cryptographic key 504 in a protected form. To generate the protected form, the sensitive cryptographic key 504 is encrypted with an HSM key to generate an HSM-key-encrypted sensitive cryptographic key 506. In some implementations, the HSM key is a manufacturer key stored on an HSM at the time of manufacture. In another implementation, the HSM key is an HSM-cluster key stored on a set of HSMs that operate as a coordinated HSM cluster. In yet another implementation, the HSM key is a key generated and retained on a particular HSM, and the sensitive cryptographic key 504 may only be used on the particular HSM.

The HSM-key-encrypted sensitive cryptographic key 506 is encrypted using a service provider key 508 to produce a service-provider-HSM-key-encrypted sensitive cryptographic key 508. The service provider key is a cryptographic key under the control of a computing resource service provider. The computing resource service provider provides a protected or isolated environment containing a bastion computer system and an HSM on which operations may be performed using the sensitive cryptographic key 504. In some examples, the service provider key is only made available to an HSM system after confirming that the environment in which the bastion computer system operates is a protected or isolated network environment.

The service-provider-HSM-key-encrypted sensitive cryptographic key 508 is encrypted using an administrator's key to produce an administrator's key 510. The administrator's key is a cryptographic key in the control of a key administrator, key officer, or collection of key administrators and key officers. In some examples, the administrator's key is divided into key pieces, and individual key pieces are distributed to a number of administrators and officers. In other examples, the administrator's key is comprised of a plurality of ordered keys, and the ordered keys are used to further encrypt the sensitive cryptographic key 504 by applying additional layers of encryption in the order of the ordered keys.

The administrator's key 510 may be secured on the storage device 502 using access controls. The access controls restrict access to the protected sensitive cryptographic key 510 to the computing resource service provider, and administrators of the sensitive cryptographic key.

Figure 6:
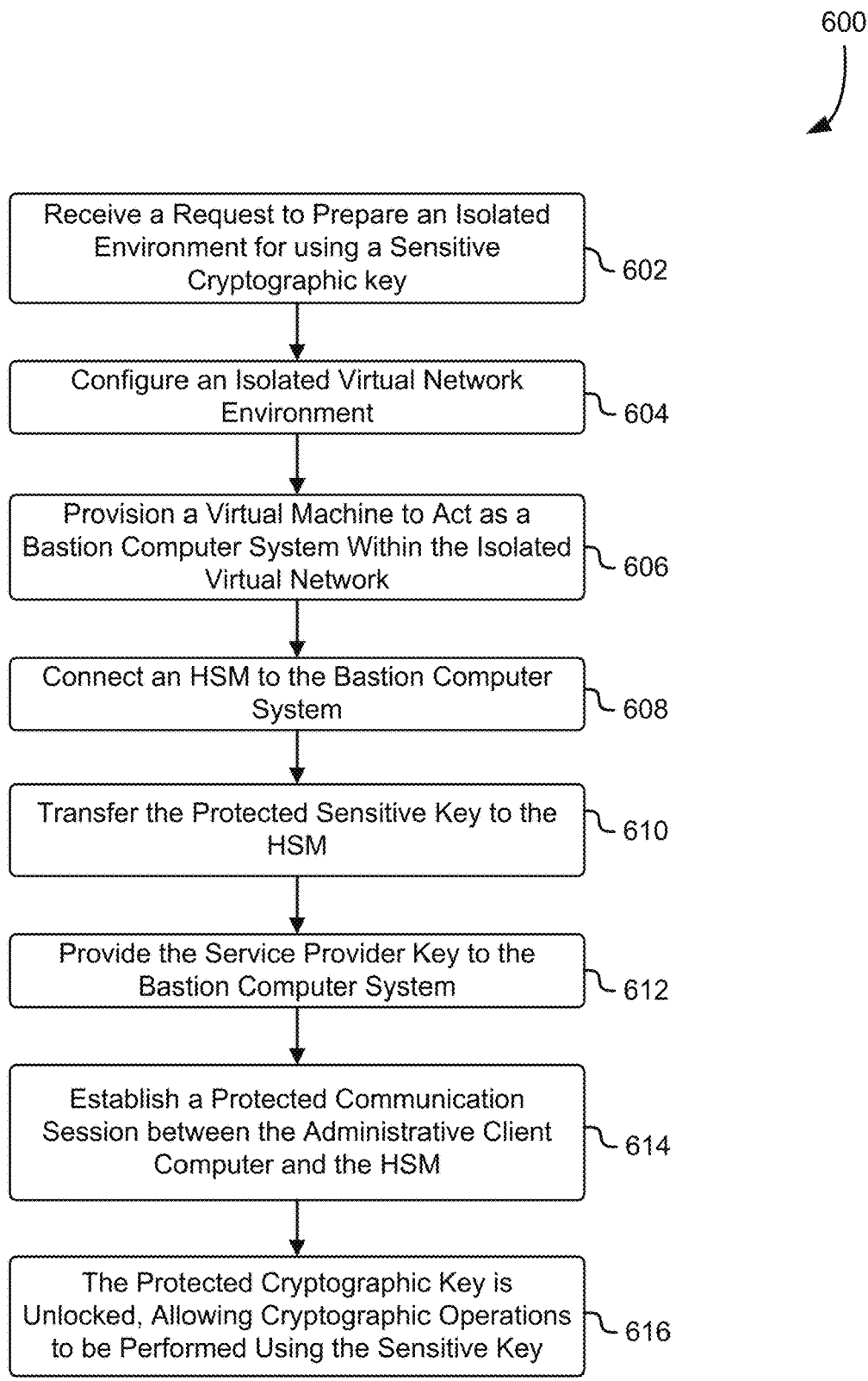
FIG. 6 shows an illustrative example of a process that, as a result of being performed by a ceremony environment manager, assembles an isolated network environment for performing cryptographic operations involving a protected cryptographic key.

FIG. 6 shows an illustrative example of a process that, as a result of being performed by a ceremony environment manager, assembles an isolated network environment for performing cryptographic operations involving a protected cryptographic key. The ceremony environment manager is a service operated by a computing resource service provider. The ceremony environment manager has access to a virtualization runtime that supports the creation and management of virtual computing resources and virtual networks. A flowchart 600 shows a process that begins at block 602 with the ceremony environment manager receiving a request to prepare an isolated environment. In some examples, the request to prepare an isolated environment may be received from an administrator of a sensitive cryptographic key via an administrative console on an outside network. In other examples, the requester for the isolated environment may be received from another service that controls access to sensitive cryptographic keys that are retained by the computing resource service provider.

At block 604, the ceremony environment manager uses the virtualization runtime to create a virtual network environment. The virtual network environment is isolated, in that network entities within the virtual network environment may communicate with each other, and only specific outside network entities designated by the ceremony event manager. At block 606, the ceremony environment manager provisions a virtual machine, and configures the networking of the virtual machine so that the virtual machine is within the isolated virtual network environment. In some examples, the ceremony environment manager provisions a physical computer system, and applies a system image to the physical computer system. The physical computer system is connected to a router, and the router is configured to connect the physical computer system to the isolated virtual network environment. The virtual computer system or physical computer system acts as a bastion computer system that hosts an HSM for performing cryptographic operations using the sensitive cryptographic key.

At block 608, the ceremony environment manager selects and HSM from an available pool of HSMs, and connects the selected HSM to the bastion computer system. In some examples, the HSM is a network-connected HSM, and the bastion computer system connects to the network-connected HSM via a virtual router provided in the virtual network environment. In other examples, the HSM is an HSM connected to a physical computer system that acts as a bastion computer system, and the physical computer system is configured to be within an isolated network. In yet another example, the HSM is an HSM connected to a host computer system that is hosting the virtual computer system, and a host driver facilitates communications between the HSM and the virtual computer system.

At block 610, the ceremony environment manager retrieves the protected version of a sensitive cryptographic key from a storage service, storage device, or network storage device under control of the computing resource service provider, and stores the protected version of the sensitive cryptographic key on the selected HSM. In some implementations, the ceremony environment manager transfers the protected version of the sensitive cryptographic key to the bastion computer system, and the bastion computer system stores the protected version of the sensitive cryptographic key to the selected HSM. The protected version of the sensitive cryptographic key may be retrieved from other locations, or may be provided by a key administrator, key officer, or unrelated storage service.

At block 612, the service provider manager retrieves a service provider key from storage maintained by the computing resource service provider, and stores the service provider key on the selected HSM. The bastion computer system transfers the service provider key to the selected HSM. In some examples, the service provider manager may perform checks on the isolated network environment to ensure that the isolated network environment is sufficiently protected before transferring the service provider key to the selected HSM.

At block 614, a protected network connection is established between an administrative console operated by a key administrator, and the selected HSM, via the bastion computer system. In some examples, a key administrator initiates a TLS connection from an administrative console to the bastion computer system. The TLS connection authenticates the identity of both the bastion computer system and the key administrator. Communications between the administrative console and the HSM are relayed by the bastion computer system, and a second key exchange occurs between the administrative console and the HSM, thereby protecting the information exchanged from eavesdropping by the bastion computer system. In yet another example, a TLS network connection is established between the HSM and the administrative console, and information transferred between the administrative console and the HSM is encrypted with a cryptographic key negotiated by the HSM in the administrative console.

At block 616, the protected cryptographic key is unlocked by the HSM, allowing access to the plaintext version of the sensitive cryptographic key. Cryptographic operations may be submitted by the administrator and performed by the HSM using the sensitive cryptographic key. The results of the graphic operations are returned to the administrator via the administrator console over a protected connection. Requests to perform cryptographic operations are authenticated and authorized by the HSM.

Figure 7:
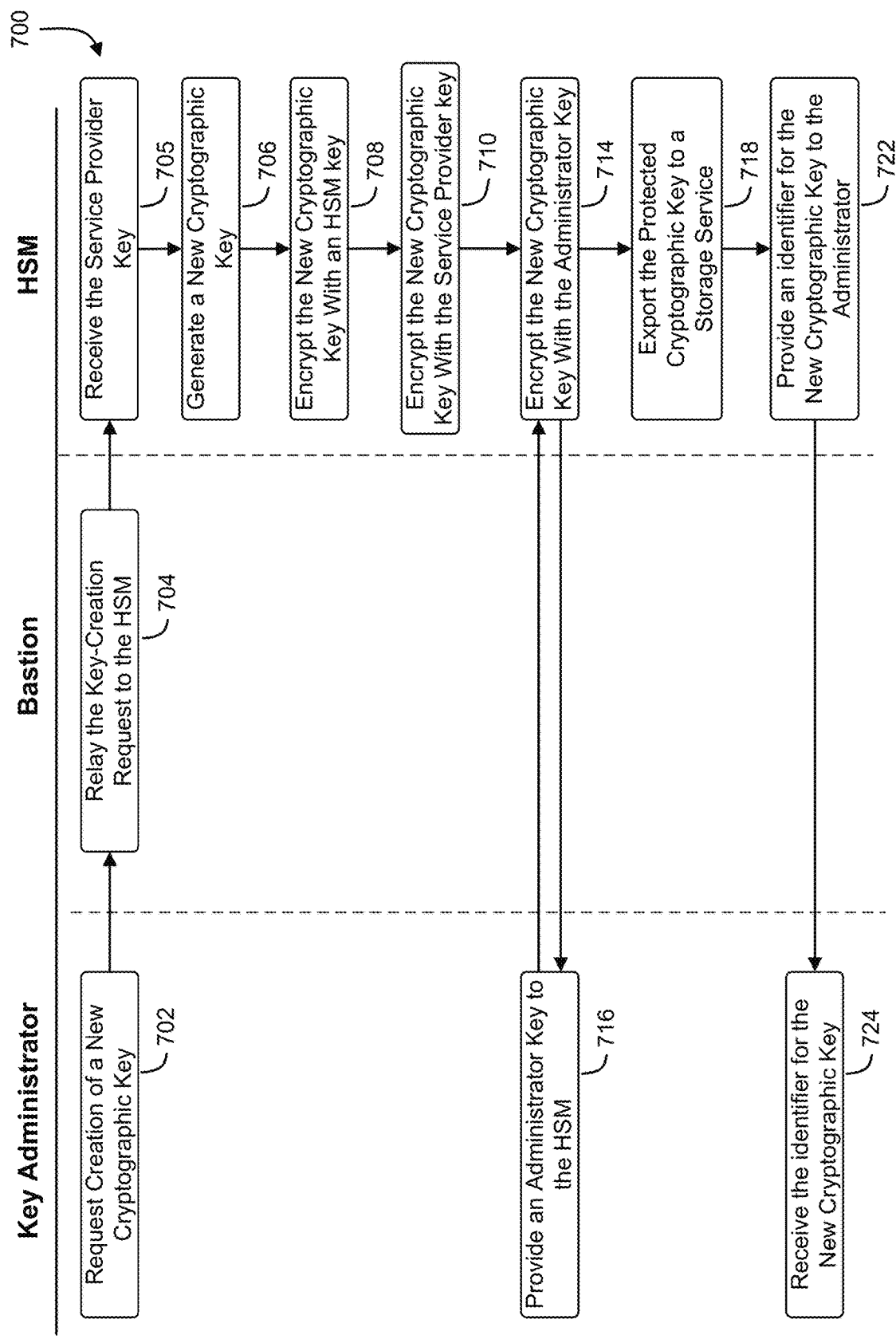
FIG. 7 shows an illustrative example of a process that, as a result of being performed by a key administrator client, a bastion computer system, and an HSM, creates and protects a new cryptographic key in an isolated network environment.

FIG. 7 shows an illustrative example of a process that, as a result of being performed by a key administrator client, a bastion computer system, and an HSM, creates and protects a new cryptographic key in an isolated network environment. A swim diagram 700 illustrates a process that begins at block 702 with a key administrator requesting creation of a new sensitive cryptographic key. The key administrator submits the request using an administrative console to the HSM via the bastion computer system. The bastion computer system receives 704 the request, and relays the key-creation request to the HSM.

The HSM receives the request to create a new sensitive cryptographic key, and receives 705 the service provider key from a service controlled by the computing service provider. The HSM generates 706 a new sensitive cryptographic key in accordance with any parameters provided with the request. The HSM encrypts 708 the new sensitive cryptographic key with an HSM key. The HSM key is a cryptographic key maintained by the HSM. At block 710, the HSM uses the service provider key provided by the service provider to encrypt the HSM-key-encrypted sensitive cryptographic key with the service provider key.

At block 714, the HSM acquires an administrator key from the administrator. In some examples, the HSM requests the administrator key from the administrator over a protected network connection, and the administrator provides 716 the administrator key via the administrator console. In some implementations, the communication occurs by the bastion computer system, but cryptographic keys are exchanged between the key administrator and HSM and used to prevent the bastion computer system from acquiring the administrator key. Once the HSM has acquired the administrator key, the HSM encrypts the bastion-and-HSM-key-encrypted sensitive cryptographic key with the administrator key to produce the protected sensitive cryptographic key. In some examples, the administrator key is split into pieces and retained by a number of administrative key holders. In such examples, the HSM contacts each of the administrative key holders and acquires the individual pieces, which are assembled by the HSM into the administrator key. In another example, a plurality of different administrator keys are retained by a corresponding plurality of administrators, and the plurality of administrator keys are acquired by the HSM. The plurality of administrator keys are sorted and used to encrypt the sensitive cryptographic key in a predetermined order. When using the sensitive cryptographic key, the plurality of administrator keys are used to decrypt the protected sensitive graphic key and the opposite of the predetermined order.

At block 718, the HSM exports the protected sensitive cryptographic key to a storage service outside the isolated environment. In some examples, the bastion computer system receives the protected sensitive to graphic key, and stores the protected sensitive a cryptographic key to a storage device or storage service. In other examples, the bastion computer system retains the protected sensitive cryptographic key on the bastion computer system, and a ceremony environment manager extracts the protected sensitive cryptographic key from the bastion computer system before the isolated network environment is deconstructed and the bastion computer system is deleted. In yet another example, the ceremony environment manager or another service operated by the computing service resource provider retrieves the protected sensitive cryptographic key from the HSM and stores the protected sensitive cryptographic key to a disk drive or remote storage service accessible to the computing resource service provider.

At block 722, the HSM provides a handle or identifier for the new sensitive cryptographic key to the administrator via the administrative console. At block 724, the key administrator receives the identifier, and may provide the identifier when requesting cryptographic operations that require the sensitive cryptographic key.

In some examples, the new cryptographic key is generated on the HSM, and the HSM encrypts the new cryptographic key with the HSM key. In another example, the new cryptographic key is provided to the HSM, and the HSM encrypts the new cryptographic key with the HSM key. If the HSM key is an asymmetric key pair, the new cryptographic key may be generated outside the HSM and encrypted outside the HSM using a public HSM key, and the private HSM key may be maintained on the HSM. In some implementations, the service provider key and/or the administrator key may be maintained on the HSM, and the HSM encrypts the HSM-key-encrypted cryptographic key with the service provider key and the administrator key at the direction of the service provider (bastion) and administrator (s) respectively.

In another example, one or more administrators and the service provider are provided with a certificate that is issued by a certificate authority ("CA") approved by the HSM. An encrypted version of an administrator key or a service provider key may be embedded in the certificate, where the encrypted version is encrypted with the cryptographic key that is stored on the HSM and not accessible outside the HSM. In some examples, the CA is recognized by the HSM administrative CA. In some implementations, the certificate includes a cryptographic key that is encrypted with the HSM key. The encryption or decryption of a protected cryptographic key may be facilitated by an authorized administrator or service provider sending a signed request to the HSM, and providing the digital certificate. The HSM authenticates the request using the signature on the request, the digital certificate, and the CA signature. After authenticating the request, the HSM-key-encrypted key within the digital certificate is decrypted within the HSM and used to encrypt or decrypt the protected cryptographic key. In one embodiment, an administrator may be issued a digital certificate containing an HSM-key-encrypted administrator's key. In another embodiment, a service provider may be issued a digital certificate that includes an HSM-encrypted version of the service provider key.

Figure 8:
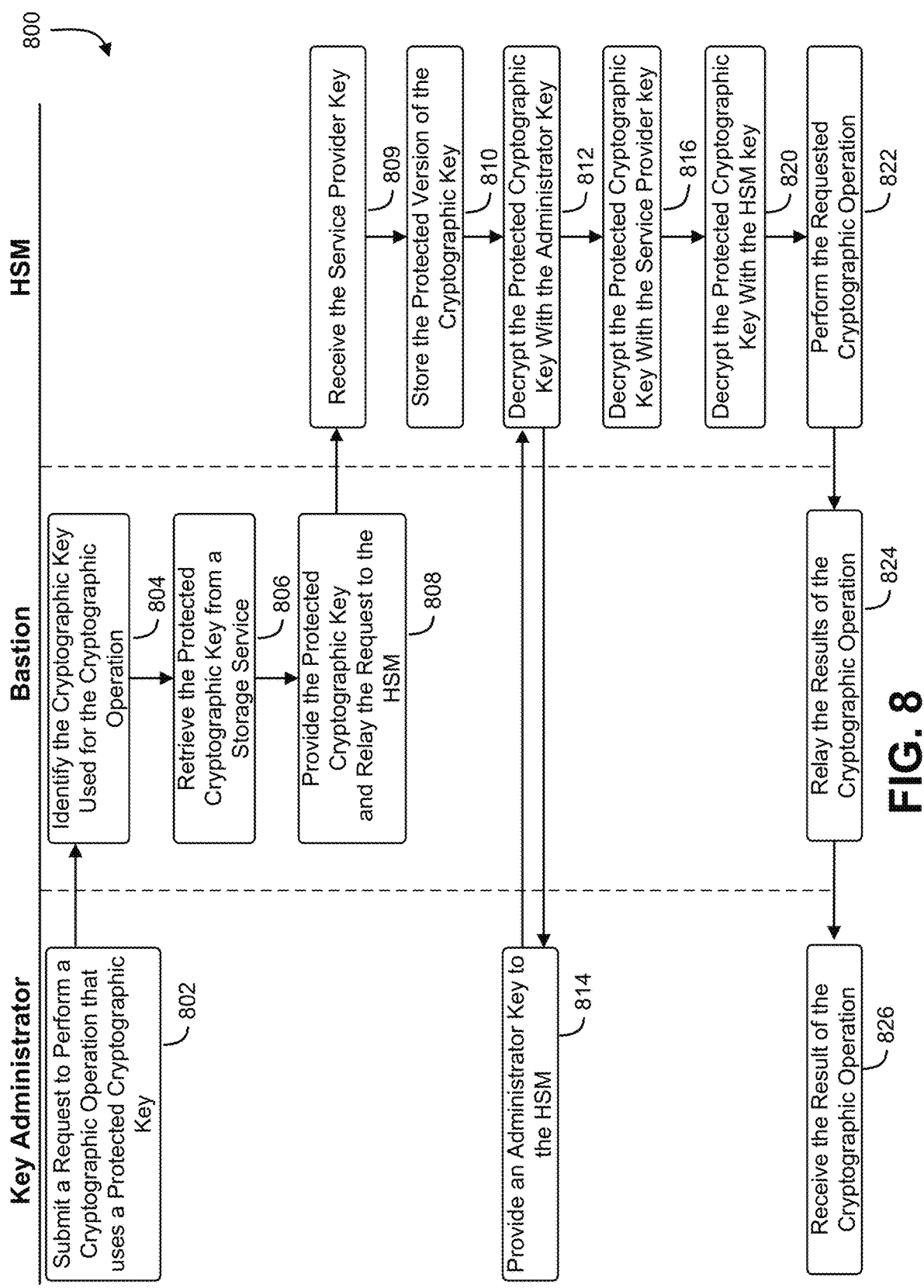
FIG. 8 shows an illustrative example of a process that, as a result of being performed by a key administrator client, a bastion computer system, and an HSM, uses a protected cryptographic key in an isolated network environment.

FIG. 8 shows an illustrative example of a process that, as a result of being performed by a key administrator client, a bastion computer system, and an HSM, uses a protected cryptographic key in an isolated network environment. A swim diagram 800 begins at block 802 with a key administrator submitting a request to perform a cryptographic operation using a protected cryptographic key. The protected cryptographic key may be identified with the request by providing a handle, identifier, or a copy of the protected cryptographic key itself.

At block 804, the bastion computer system receives the request to perform a cryptographic operation, and identifies the cryptographic key associated with the request. If the protected version of the cryptographic key is not provided with the request, the bastion computer system retrieves 806 the protected version of the cryptographic key from a storage service, network storage device, or a local storage device. At block 808, the bastion computer system provides the protected version of the cryptographic key along with the request to the HSM.

The HSM receives the protected version of the cryptographic key at block 809, and stores 810 the protected version of the cryptographic key on the HSM. At block 812, the HSM requests an administrator key from the key administrator, and in response, the key administrator provides 814 the administrator key to the HSM. In some implementations, the administrator key may be acquired by retrieving a plurality of key pieces from a corresponding plurality of key administrators and assembling the pieces in the HSM to create the administrator key. The HSM decrypts the protected version of the cryptographic key using the administrator key to remove a layer of decryption from the protected version of the cryptographic key.

At block 816, the HSM uses the service provider key provided by the computing resource service provider to remove a layer of encryption from the protected cryptographic key. In some implementations, the ceremony environment manager provides the service provider key to the HSM when the isolated network environment is created by the computing resource service provider. In another implementation, a service provider service provides the service provider key to the HSM after confirming that the isolated network environment is protected. The HSM decrypts the protected cryptographic key using the service provider key to remove a layer of encryption from the protected cryptographic key.

At block 820, the HSM removes the final layer of protection from the protected cryptographic key by decrypting the protected cryptographic key with an HSM key. The HSM key is a cryptographic key maintained on the HSM. In some examples, the HSM key is a manufacturer's key written to the HSM by the manufacturer of the HSM. At block 822, the plaintext version of the cryptographic key is available, and the HSM performs the requested cryptographic operation. The results of the cryptographic operation are returned to the key administrator via the bastion computer system over a protected communication channel. At block 824, the bastion computer system relays the results of the cryptographic operation to the key administrator, and the key administrator receives 826 the results of the cryptographic operation on an administrative console.

In some examples, the decryption of the protected cryptographic key occurs partly outside the HSM, and completes in the HSM. In one implementation, the protected cryptographic key is provided to the administrator, and the administrator's key is used to decrypt the protected cryptographic key, removing a layer of encryption from the protected cryptographic key. The resulting encrypted key is transferred to the bastion computer, and the service provider key is used to remove an additional layer of encryption. After decrypting with both the administrator and service provider keys, the resulting protected key is transferred to the HSM, and the HSM decrypts the resulting protected key to reveal the plaintext version of the cryptographic key.

Figure 9:
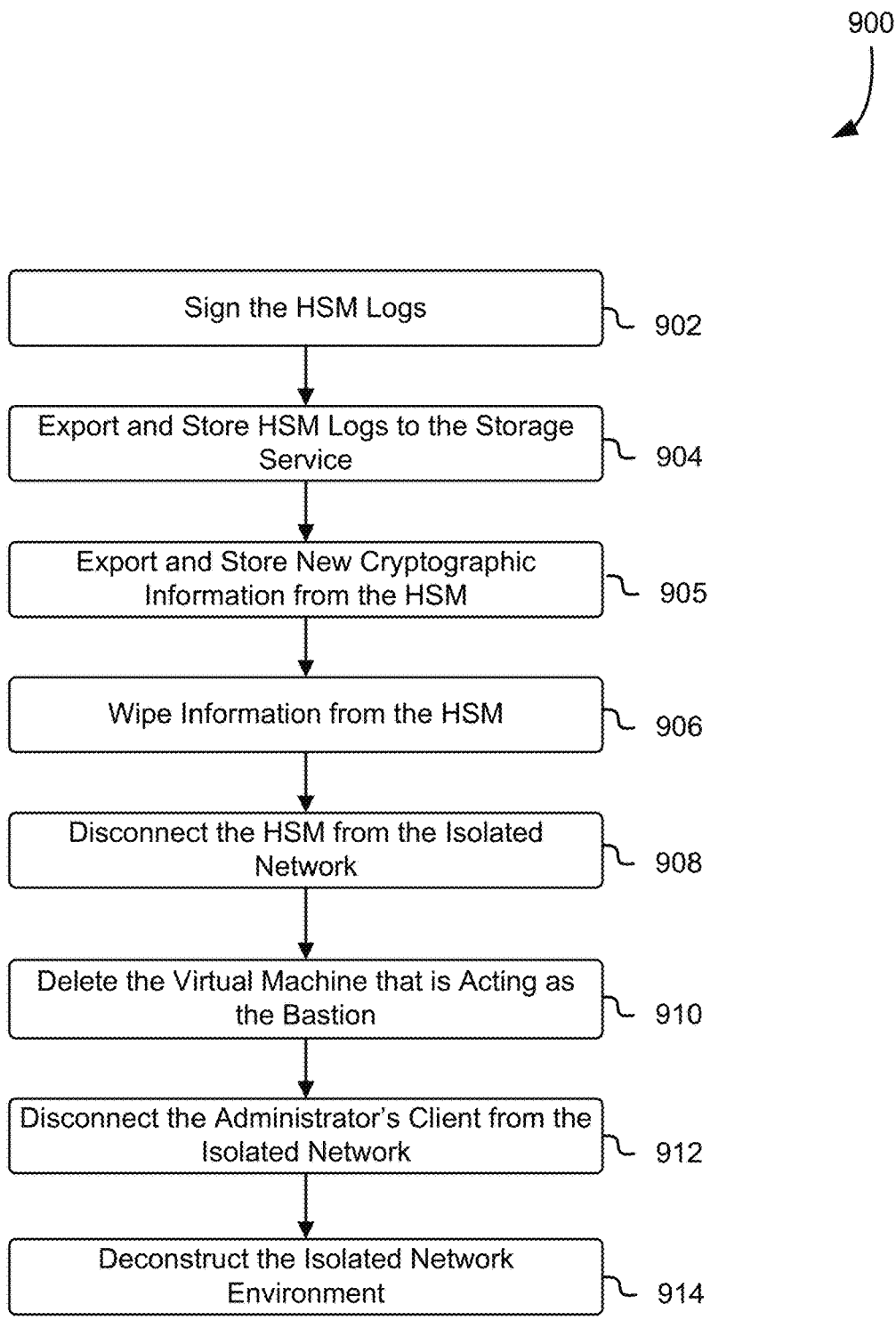
FIG. 9 shows an illustrative example of a process that, as a result of being performed by a ceremony environment manager, tears down an isolated network environment used to perform cryptographic operations on a protected cryptographic key.

FIG. 9 shows an illustrative example of a process that, as a result of being performed by a ceremony environment manager, tears down an isolated network environment used to perform cryptographic operations on a protected cryptographic key. A flowchart 900 illustrates a process that begins at block 902 with a ceremony environment manager signing a set of logs generated by an HSM. In some implementations, the ceremony environment manager requests that the HSM encrypts the set of logs with one or more of an HSM key, a service provider key and an administrator key. In another implementation, the ceremony environment manager requests the logs from the HSM, and the HSM signs the logs with one or more of the HSM key, the service provider key, and the administrator key. After the logs are encrypted and/or signed, the ceremony environment manager exports 904 the logs from the HSM stores, the logs on a storage service, network-connected disk drive, or other storage device outside the isolated network environment. If new cryptographic keys or cryptographic information has been generated on the HSM, the ceremony environment manager protects the new cryptographic keys or cryptographic information by encrypting the information with the HSM key, the service provider key, and the administrator key, and exports 905 the protected information to a storage service outside the isolated environment.

At block 906, the ceremony environment manager deletes sensitive information from the HSM including any sensitive cryptographic keys, service provider keys, and administrator keys. HSM keys such as manufacturer keys and HSM cluster keys may be retained on the HSM. Information may be deleted from the HSM in a variety of ways. In some examples, memory that holds the information is overwritten with other information, a random pattern, or a sequence of predetermined values. In other examples, information is deleted by changing directory information so that the memory that holds the information is made available for other purposes. In yet another example, information may be deleted by marking the blocks of memory that contain information the information as deleted. In yet another example, information is deleted from the memory by writing a random data pattern in the memory a threshold number of times. In yet another example, information is deleted from the memory by disconnecting a power source from the memory. The HSM is disconnected 908 from the isolated environment and may be made available to other services, applications, or customers. At block 910, the ceremony environment manager deletes information from the bastion computer system, and frees resources dedicated to the bastion computer system. In some implementations, the ceremony environment manager deletes a virtual machine that is acting as the bastion computer system. In other implementations, the ceremony environment manager deletes information from a physical computer system, and makes the physical computer system available for other uses.

Connections between the administrator and the bastion computer system or HSM are terminated 912. In some implementations, the ceremony environment manager terminates the connections between the administrator and the bastion computer system, and provides a confirmation that the information contained in the isolated network environment has been destroyed. At block 914, the isolated network environment is deconstructed. In some implementations, the isolated network environment is a virtual network which is deleted. In other implementations, the isolated network environment is created using physical routers, and network configuration information establishing the isolated network environment is deleted from the physical routers.

Figure 10:
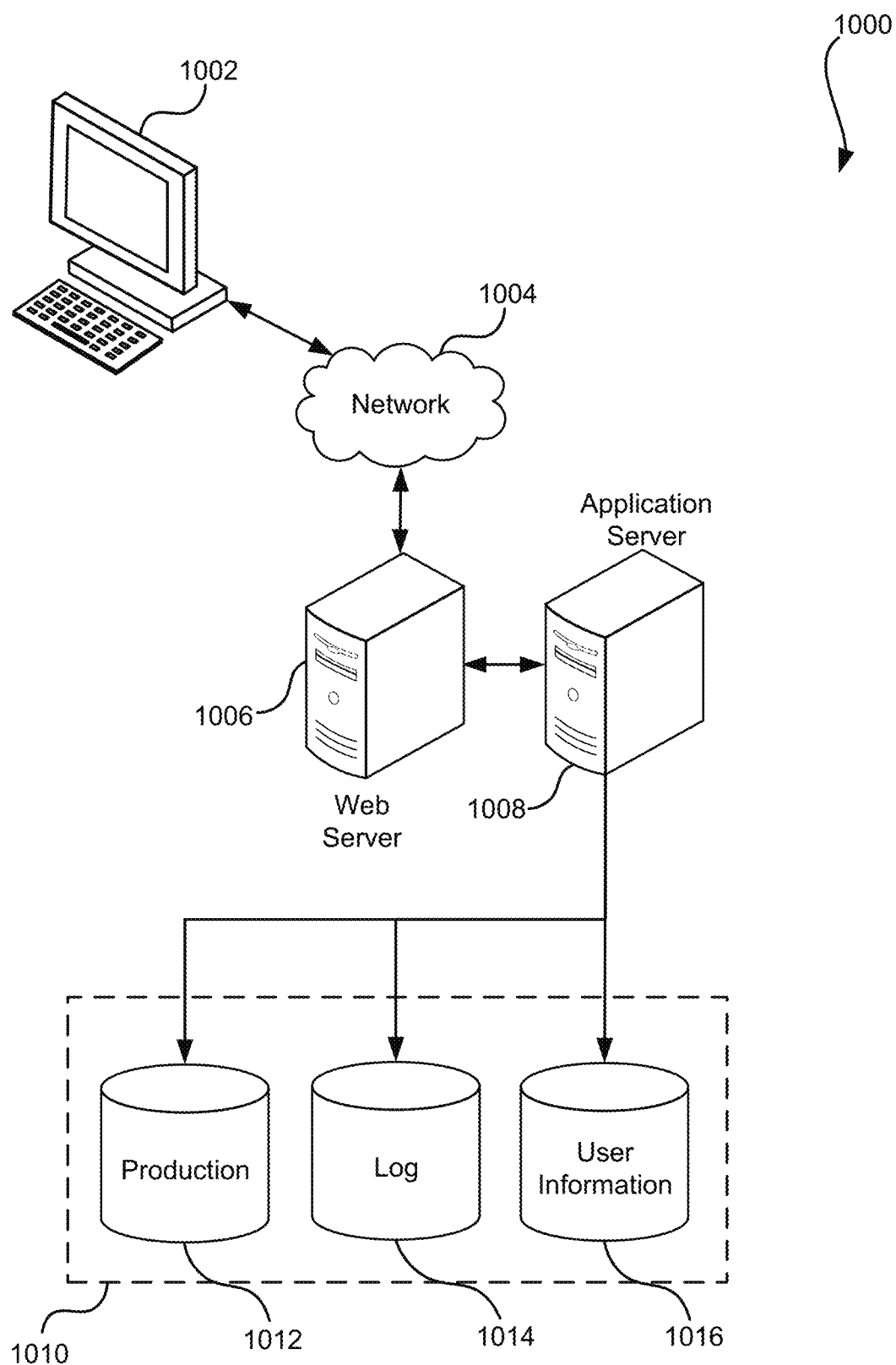
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C #, or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus or backplane, the elements including, for example, at least one central processing unit ("CPU" or "processor"), at least one input device (e.g., a mouse, keyboard, controller, touch screen, or keypad), and at least one output device (e.g., a display device, printer, or speaker). A backplane is a group of electrical connectors on a circuit board that is part of a computer system. In many examples, the backplane implements an interface standard such as PCI, ISA, or EISA. Compatible peripheral cards or components are installed on the computer system by connecting them to the electrical connectors. Examples of a backplane include a PCI backplane, PCI-Express backplane, or ISA backplane. Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

As discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CASTS, RC4, and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure and the above is not intended to be an exhaustive list.

Note that the term "digital signature" includes any information usable to cryptographically verify authenticity of a message including information generated using an RSA-based digital scheme (such as RSA-PSS), the digital signature algorithm (DSA), and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

It should be noted that the phrase "one-way function" includes functions that are not necessarily one-way in the strict mathematical sense, but that exhibit properties (such as collision resistance, preimage resistance and second preimage resistance) that render the function useful in contexts in which the various techniques of the present disclosure are applied. In this manner, an entity with output of the function but without access to the corresponding input, is unable to determine the input without, for instance, extraordinary expenditure of computational resources necessary for a cryptographic (e.g., brute force) attack. One-way functions (also referred to as "effectively one-way functions") include, but are not limited to, cryptographic hash functions such as message authentication codes, (e.g., hash based message authentication code (HMAC)), key derivation functions, such as PBKDF2 and Bcrypt (with the password being based at least in part on the plaintext and the cryptographic key, e.g.) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of preimage resistance (given a value y, the probability of randomly generating an input x such that $f(x)=y$ is below a specified threshold), second preimage resistance (given an input x1, the probably of randomly generating another input x2, different from x1, such that $f(x1)=f(x2)$ is below a specified threshold) and/or collision resistance (the probability of two different inputs resulting in the same output is less than a specified threshold). The exact threshold for each probability may be context-dependent, with lower probabilities corresponding to higher security contexts. Hash functions usable as one-way functions in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference.

Information may be said to be programmatically unexportable if there is no legitimate way to programmatically cause (e.g., through an interface of the device) the device to provide the information). The information may be maintained, for example, such that there is no request mechanism (e.g., application programming interface (API) call) for causing hardware, with access to the information in plaintext form, to reveal the information in plaintext form. As an example, a device storing the information (e.g., cryptographic module) may be configured to lack an ability to provide a copy of some or all of its memory such that the copy includes the information in plaintext form. It should be noted however, that while information for which there is no legitimate way of obtaining the information in plaintext form is used throughout the disclosure for the purpose of illustration, some information may be maintained such that the information is obtainable through a limited number of authorized uses, which may require various security protocols to be employed and able to prevent unauthorized access to the information in plaintext form. Generally, programmatically unexportable information is information (e.g., one or more cryptographic keys) for which extraordinary measures must be taken to obtain the information in plaintext form, if it is possible at all to obtain the information in plaintext form.

Note that a system is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key is successful.

In various embodiments, data objects such as digital signatures may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B or C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:
   receiving, from a key administrator, a request to perform a cryptographic operation using a secret cryptographic key;
   causing a bastion computer system to connect to a hardware security module, the bastion computer system and the hardware security module being connected in an isolated computer network and the hardware security module retaining a first cryptographic key;
   causing a second cryptographic key to be stored on the hardware security module, the second cryptographic key obtained from the bastion computer system;
   causing the hardware security module to store a third cryptographic key by at least calculating the third cryptographic key based at least in part on a first portion of the third cryptographic key and a second portion of the second cryptographic key, the first portion of the third cryptographic key and the second portion of the second cryptographic key obtained from the bastion computer system;
   storing, by a storage service, a protected version of the secret cryptographic key encrypted with the first cryptographic key, the second cryptographic key, and the third cryptographic key;
   causing the protected version of the secret cryptographic key to be provided by the storage service to the hardware security module via the bastion computer system and decrypted with the first cryptographic key, the second cryptographic key, and the third cryptographic key by the hardware security module; and
   fulfilling the request, based at least in part on approval of a threshold number of administrators comprising a quorum, by at least causing the hardware security module to perform the cryptographic operation using the secret cryptographic key to produce a result.

2. The computer-implemented method of claim 1, further comprising creating the isolated computer network at least in part by:
   creating a virtual network connected to the bastion computer system, the virtual network including a virtual router; and
   configuring the virtual router to allow a network connection between the virtual network and the hardware security module.

3. The computer-implemented method of claim 1, further comprising:
submitting a credential provided by the key administrator to the storage service to authorize access to the protected version of the secret cryptographic key; and
wherein causing the protected version of the secret cryptographic key to be provided by the storage service is a result of the storage service verifying the credential.

4. The computer-implemented method of claim 1, further comprising:
providing the result to the key administrator via a protected communication channel;
deleting the second cryptographic key, the third cryptographic key, the secret cryptographic key, and the protected version of the secret cryptographic key from the hardware security module;
disconnecting the hardware security module from the isolated computer network; and
deleting the isolated computer network.

5. The computer-implemented method of claim 1, wherein the threshold number of administrators further comprises one administrator; and
wherein the approval to perform the cryptographic operation is included in the request.

6. A system, comprising:
one or more processors; and
memory that stores computer-executable instructions that, as a result of being executed, cause the one or more processors to:
transfer a protected cryptographic key from a computer system to a hardware security module within a protected network environment that comprises the computer system and the hardware security module, the protected cryptographic key obtained from a storage service;
receive a first portion of a third cryptographic key and a second portion of the third cryptographic key from one or more client computer systems outside the protected network environment via one or more cryptographically protected communications channels to the computer system;
generate the third cryptographic key by at least calculating the first portion of the third cryptographic key and the second portion of the third cryptographic key;
transfer a second cryptographic key from the computer system to the hardware security module;
acquire a secret cryptographic key by decrypting the protected cryptographic key on the hardware security module using a first cryptographic key stored on the hardware security module, the second cryptographic key, and the third cryptographic key;
perform a cryptographic operation on the hardware security module using the secret cryptographic key to produce a result based at least in part on a quorum of administrators providing approval to perform the cryptographic operation; and
provide the result to the client computer system outside the protected network environment.

7. The system of claim 6, wherein the memory further includes instructions that, as a result of being executed, cause the one or more processors to:
generate a new cryptographic key on the hardware security module;
encrypt the new cryptographic key with a combination of the first cryptographic key, the second cryptographic key, and the third cryptographic key to produce an encrypted new cryptographic key; and
export the encrypted new cryptographic key from the hardware security module to the storage service.

8. The system of claim 7, wherein the memory further includes instructions that, as a result of being executed, cause the one or more processors to:
store the encrypted new cryptographic key on a storage device outside the protected network environment, the storage device provided by the storage service; and
delete the new cryptographic key, the encrypted new cryptographic key, the first cryptographic key, the second cryptographic key, and the third cryptographic key from the hardware security module.

9. The system of claim 8, wherein the memory further includes instructions that, as a result of being executed, cause the one or more processors to:
deconstruct the protected network environment;
delete the second cryptographic key from the computer system; and
send an indication to the client computer system indicating that the secret cryptographic key is no longer available for use.

10. The system of claim 6, wherein the memory further includes instructions that, as a result of being executed, cause the one or more processors to:
receive, at the hardware security module, a certificate signing request from the client computer system;
generate a digital signature for the certificate signing request using the secret cryptographic key; and
return the digital signature to the client computer system.

11. The system of claim 6, wherein memory further includes instructions that, as a result of being executed, cause the one or more processors to:
generate a set of logs that describe the cryptographic operation performed with the secret cryptographic key;
sign the set of logs with at least one of the first cryptographic key, the second cryptographic key, or the third cryptographic key to produce an encrypted set of logs; and
export the encrypted set of logs.

12. The system of claim 6, wherein the memory further includes instructions that, as a result of being executed, cause the one or more processors to:
receive, from a key administrator, a request to perform the cryptographic operation from the client computer system over the cryptographically protected communication channel;
authenticate the request as originating from the key administrator; and
authorize the request based at least in part on an identity of the key administrator.

13. The system of claim 6, wherein the memory further includes instructions that, as a result of being executed, cause the one or more processors to:
determine that the protected network environment is isolated from network entities other than the client computer system, the computer system, and the hardware security module; and
provide the second cryptographic key to the hardware security module.

14. A hardware security module comprising a processor coupled to a non-transitory computer-readable storage medium storing thereon executable instructions that, as a result of being executed by the processor, cause the hardware security module to at least:

receive an encrypted cryptographic key from a storage service, the encrypted cryptographic key encrypted with at least a first cryptographic key, a second cryptographic key, and a third cryptographic key, the first cryptographic key retained on the hardware security module;

receive the second cryptographic key from a bastion computer system connected to the hardware security module within an isolated network environment;

receive, from the bastion computer system, at least a first portion of the third cryptographic key obtained from a key administrator over a secure connection between a computer system operated by the key administrator and the bastion computer system and a second portion of the third cryptographic key obtained from a second key administrator over a second secure connection between a second computer system operated by the second key administrator and the bastion computer system;

reconstitute the third cryptographic key by at least calculating the first portion of the third cryptographic key and the second portion of the third cryptographic key;

decrypt the encrypted cryptographic key using the first cryptographic key, the second cryptographic key, and a third cryptographic key to produce a cryptographic key;

perform a cryptographic operation using the cryptographic key to produce a result based at least in part on obtaining approval from a threshold number of administrators; and export the result of the cryptographic operation to the computer system.

15. The hardware security module of claim 14, wherein the instructions further comprise instructions that, as a result of being executed by the processor, cause the hardware security module to further:

generate a new cryptographic key;

encrypt the new cryptographic key with the first cryptographic key, the second cryptographic key, and the third cryptographic key to produce a protected version of the new cryptographic key; and export the protected version of the new cryptographic key to the storage service.

16. The hardware security module of claim 14, wherein:

the bastion computer system is a virtual computer system hosted by a physical host computer system;

the hardware security module is connected to the physical host computer system via a backplane;

communication between the hardware security module and the bastion computer system is facilitated using a virtual device driver running on the physical host computer system; and the second cryptographic key is received from the bastion computer system via the virtual device driver.

17. The hardware security module of claim 14, wherein the instructions further comprise instructions that, as a result of being executed by the processor, cause the hardware security module to:

receive a plurality of key pieces from a corresponding plurality of key, administrators; and combine the plurality of key pieces to form the third cryptographic key.

18. The hardware security module of claim 14, wherein the instructions further comprise instructions that, as a result of being executed by the processor, cause the hardware security module to further:

receive a plurality of cryptographic keys from a corresponding plurality of key administrators;

decrypt the encrypted cryptographic key using the plurality of cryptographic keys to produce the cryptographic key; and wherein the encrypted cryptographic key is further encrypted with the plurality of cryptographic keys.

19. The hardware security module of claim 14, wherein the instructions further comprise instructions that, as a result of being executed by the processor, cause the hardware security module to further:

generate a set of logs that describe the cryptographic operation performed;

generate a cryptographic signature for the set of logs using the first cryptographic key, the second cryptographic key, and the third cryptographic key to produce a set of signed logs; and export the set of signed logs.

20. The hardware security module of claim 14, wherein:

an encrypted version of the third cryptographic key is received by the hardware security module in a digital certificate issued to the key administrator;

the key administrator authenticated by the hardware security module using the digital certificate;

the encrypted version of the third cryptographic key is encrypted with a fourth cryptographic key that resides in the hardware security module; and the hardware security module decrypts the encrypted version of the third cryptographic key using the fourth cryptographic key to obtain the third cryptographic key.

* * * * *